(No Model.)
2 Sheets—Sheet 1.
W. ADAMS.
ELECTRIC MOTOR.
No. 300,827. Patented June 24, 1884.
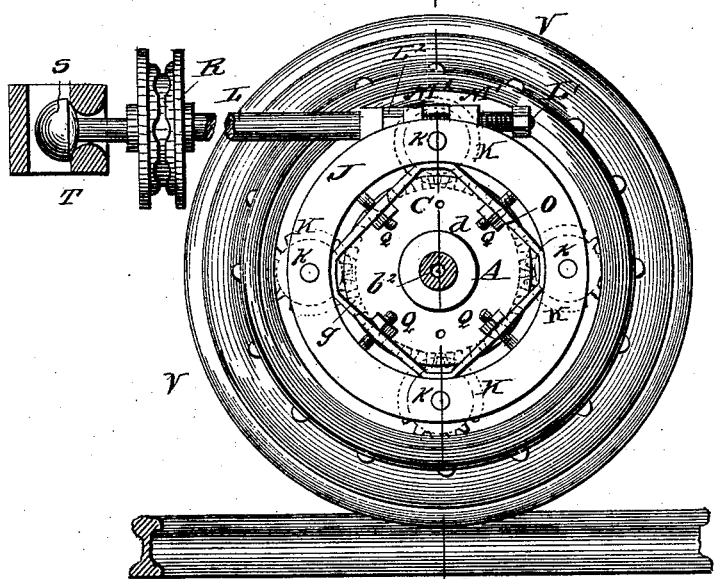
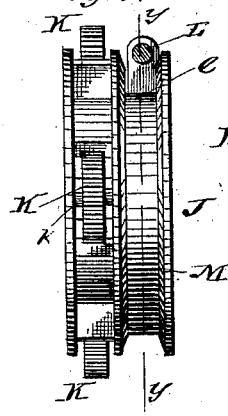
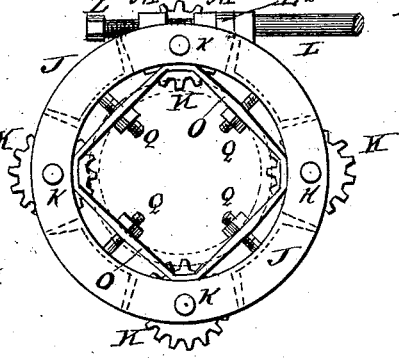
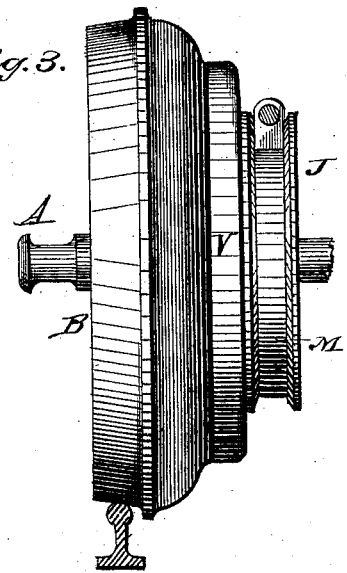
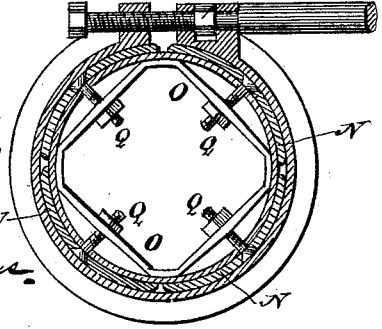
Witnesses:
Phil C. Dietrich
Frankland James
Inventor:
Wellington Adams
by
T. W. Alexander
Attorney.

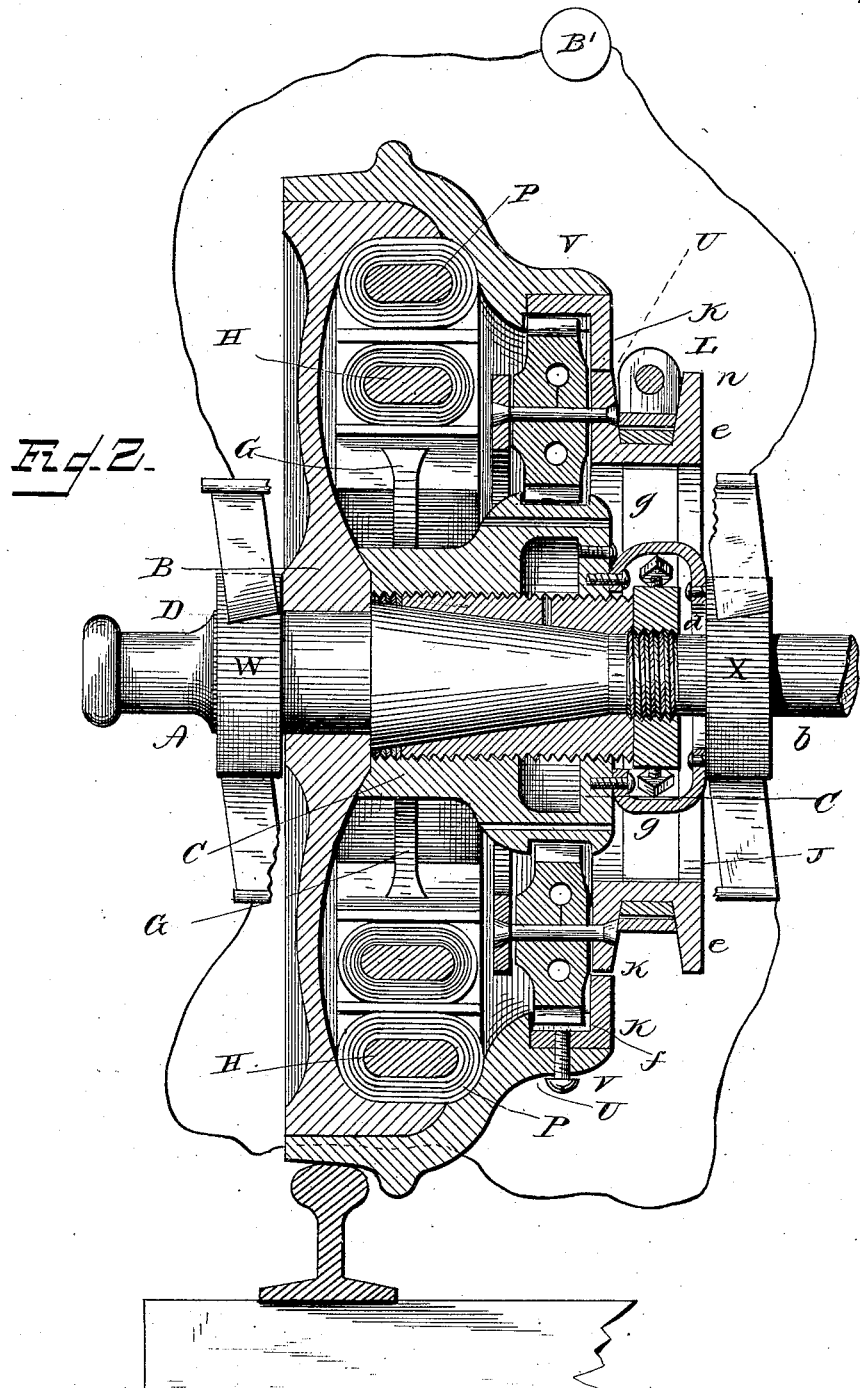

UNITED STATES PATENT OFFICE.

WELLINGTON ADAMS, OF ST. LOUIS, MISSOURI, ASSIGNOR TO THE ADAMS ELECTRIC COMPANY, OF SAME PLACE.

ELECTRIC MOTOR.

SPECIFICATION forming part of Letters Patent No. 300,827, dated June 24, 1884.

Application filed March 27, 1883. (No model.)

*To all whom it may concern:*

Be it known that I, WELLINGTON ADAMS, of St. Louis, in the county of St. Louis and State of Missouri, have invented certain new and useful Improvements in Electric Motors; and I do hereby declare that the following is a full, clear, and exact description thereof, reference being had to the accompanying drawings, and to the letters of reference marked thereon, which form part of this specification.

The present invention relates to improvements in the construction of electric motors suited to the propulsion of railroad-cars and to the operation of light machinery of various kinds—for instance, sewing-machines and dental instruments—as will be hereinafter explained.

In the accompanying drawings, Figure 1 is an elevation, partly in section, showing the general construction and arrangement of a railroad-car wheel and axle with my motor applied thereto. Fig. 2 is a section enlarged on line $x\,x$, Fig. 1, representing diagrammatically the circuit-connections. Fig. 3 is an edge view of a car-wheel embodying my improved propelling device. Fig. 4 is an edge view, and Fig. 5 is a side elevation, of the centrifugal clutch mechanism hereinafter referred to. Fig. 6 is a section on line $y\,y$, Fig. 4.

Similar letters denote like parts.

A represents the axle of a railroad-car. To it is fixed the part B, which constitutes the web of the car-wheel, and to the part B is secured the tire or tread V.

Within the part B is rigidly secured a Pacinotti ring, P, constituting the field-magnet of the motor. The axle tapers inwardly from the part B, and fitting this tapered part is an exteriorly-screw-threaded bushing, D, on which is the interiorly-screw-threaded hub C. The bushing, which revolves on the axle, can be set up on the tapered portion of the latter to compensate and take up for wear, being held in desired position by a jam-nut, $d$, on the axle, provided with suitable set-screws to hold it up into place. In this hub is an oil-chamber, $c$, from which the lubricant passes through one or more apertures in the bushing to the axle.

From the hub C radiate spokes G, which carry a second Pacinotti or Gramme ring, H, arranged within the outer ring, P, and constituting the armature of the motor.

In order to transmit the movement of the armature to the wheel, the hub C (which moves with the armature) is formed or provided with a gear, $g$, with which mesh pinions K, whose axles are fast to a ring, J, and are lubricated from oil-chambers $f$ in the pinions. These pinions also mesh with a rack, U, on the interior of the overhanging portion of the tread V of the wheel. When the armature is in rotation, the ring J, so long as it is unrestrained, will revolve, and its pinions K will impart no movement to the wheel; but as soon as the ring is held stationary the pinions at once act to drive the rack U, and consequently to revolve the wheel in a direction opposite to that of the armature. For the purpose of thus controlling the ring J, I combine with it a clutch or retaining device which can be operated to hold fast or release the ring, as desired.

The particular form of retaining device shown in the drawings in illustration of my invention is a centrifugal clutch composed of segments N, which lie in a groove, $e$, in the periphery of the ring J, and are held down therein by springs O, connected with them by screw-bolts Q, provided with nuts, by means of which the tension of or power exerted by the springs can be regulated. Surrounding the clutch-segments is a stationary band, M, with which the segments are to co-operate. When the armature is in rotation, the ring J will revolve so long as the speed of rotation is not sufficient to move the segments out against the stress of their springs far enough to abut against the band; but when the speed is sufficiently great the segments will bear against the band, the ring J will be held fast, and consequently the pinions K will put in revolution the wheel. As soon as this takes place the band M, by proper means, is gradually tightened until it clasps firmly and closely the segments, binding them down tightly upon the ring J. In order to thus operate the band, I provide its abutting ends, the one with a lug, M′, and the other with two lugs, M² M². The screw-threaded end of a shaft, L, passes loosely through lugs M², and screws through the lug M′. The portion of the shaft passing through the lugs is reduced in size, and on this reduced portion, between the lugs M² M², is fixed a collar, L'. Under this arrangement it will be seen that when the shaft is rotated it will expand or contract the band according to the direction in which it is moved. The shaft has a rounded head, S, which has a stationary yet flexible bearing, T, in a suitable portion of the frame-work of the car, and, for the purpose of rotating it, is provided with a chain or sprocket wheel, R, the chain from which will obviously extend to a drum or like instrumentality at some convenient point on the car, by means of which the attendant can loosen, tighten, or adjust the band at pleasure.

The circuit-connections of the motor are indicated diagrammatically in Fig. 2. There are two commutators, W X, the former electrically connected with the field-magnet and mounted on the axle, the latter electrically connected with the armature, and mounted on the armature-hub or an extension thereof.

Y Z are the respective sets of commutator-brushes, which are to be secured to the car truck or body, or to some stationary part of the structure. The circuit is from the generator through the field, thence through the armature, and thence back to the generator. The field-ring P, being secured to the outer and tire-carrying portion of the wheel, and the armature-ring H being independently mounted and connected, as described, when the said outer ring is energized, consequent points or poles are developed in the said ring, which cause it to operate as a field-magnet to the inner ring, H. The ring H, being magnetized in an opposite sense to its field-magnet P, is strongly attracted thereto, and the rings being constructed with alternating sections of coiled wire and soft iron and moved in opposite directions, as stated, the poles will remain very near a predetermined point, preferably on a line passing vertically through the axis of the device. The line of strongest magnetic effect will be carried across this vertical line by the sections, and when said iron is followed by its succeeding mass of wire the magnetic line referred to will recede or jump back to the next iron section to the rear of the mass of wire at any movement passing the vertical point. In this manner the polarity of the rings, while confined to a very small amplitude of vibration, does in effect approach and recede from the vertical line, the result being that the two rings rotating in opposite directions act upon each other with the strongest magnetic force attainable.

Assuming the clutch to be properly adjusted and the armature to be in revolution, the operation is as follows: The power of the armature H is transmitted from the hub C to the wheel through the pinions K and rack U only when the speed of rotation has reached a predetermined point, which is regulated by the adjustment of the clutch. The pieces N are held with any desired degree of force by the adjustable bolts Q and springs O, and as the speed with which the ring J is rotated by the armature H increases, the tendency is for these pieces N to be thrown into contact with the band M by centrifugal action. As soon as this happens the said shaft L and band M being secured to the car, rotary motion of the ring J ceases and the power developed by the rotating hub C is conveyed directly through hub C, pinions K, and rack U to the tire of the wheel. As soon as this takes place the attendant or engineer rotates the shaft L in a direction to clamp and bind firmly the band M on the ring V, and the car then continues in motion until the clutch is caused to release its hold.

In applying this motor to other mechanical uses—as, for instance, to a sewing-machine—the device substantially as herein shown is attached to a suitable portion of the main shaft of the machine to be driven, and the shaft L is secured to the table-support.

Having described my invention, I claim—

1. In an electro-dynamic machine, an annular field-magnet and inclosing-casing therefor, adapted to constitute the tire-supporting portion of a car-wheel, as set forth.

2. The combination, with a car-wheel, of an electro-dynamic machine whose field-magnet and armature are incased by said wheel, substantially as and for the purposes hereinbefore set forth.

3. The combination, with a car-wheel, of an annular field-magnet carried by said wheel, an armature adapted to be rotated within said field-magnet, and a shaft supporting the armature and constituting an axle for the wheel, substantially as and for the purposes hereinbefore set forth.

4. The combination, with the rotating armature and the wheel to be driven thereby, of intermediate motion transmitting and controlling mechanism arranged and operating, substantially as hereinbefore set forth, to automatically throw the armature into gear with the wheel to be driven when its speed of rotation has reached a predetermined point, as and for the purposes specified.

5. In an electro-dynamic machine, an annular field-magnet rigidly attached to the supporting or main axle, and provided with a tire-supporting casing, in combination with an armature moving within the field-magnet, and having a hub mounted upon said axle, gearing connecting the periphery of said hub to the interior of the tire-supporting casing, automatic clutching devices supported by the connecting-pinions, and means, substantially as described, for varying the tension of the clutch-operating mechanism and the speed at which the same becomes operative, as set forth.

6. In combination with an annular field-magnet and an armature contained and rotating therein, the hub C, pinions K, ring J, provided with sections N, springs O, and adjusting-screws, the stationary adjustable band M, and shaft L, substantially as shown and described.

7. In an electro-dynamic machine, the combination of armature H, and hub C, having oil-chamber c, with adjustable bushing D, and suitable jam-nut, and the main axle A, substantially as set forth.

8. The centrifugal adjustable clutch and its controlling-shaft, in combination with the armature, the wheel, and the pinions carried by the clutch and engaging gearing carried by the armature and wheel, respectively, under the arrangement and for operation substantially as hereinbefore set forth.

9. The combination, with the axle or shaft to be driven, of an electric motor whose armature is mounted to revolve on said shaft, and intermediate transmitting-gearing for imparting movement from the armature to said shaft or axle, substantially as and for the purposes hereinbefore set forth.

In testimony that I claim the foregoing as my own I affix my signature in presence of two witnesses.

WELLINGTON ADAMS.

Witnesses:
T. H. ALEXANDER,
FRANKLAND JANNUS.